(12) United States Patent
Emami

(10) Patent No.: US 9,788,224 B2
(45) Date of Patent: Oct. 10, 2017

(54) ENERGY EFFICIENT STAGGERED SHORT TRANSMISSIONS (SST) PROTOCOL FOR WIRELESS SENSOR NETWORKS (WSN)

(71) Applicant: SAMSUNG ELECTRONICS CO., LTD., Suwon, Gyeonggi-do (KR)

(72) Inventor: Shahriar Emami, Santa Clara, CA (US)

(73) Assignee: Samsung Electronics, Co., Ltd., Suwon-si (KR)

(*) Notice: Subject to any disclaimer, the term of this patent is extended or adjusted under 35 U.S.C. 154(b) by 424 days.

(21) Appl. No.: 13/872,002

(22) Filed: Apr. 26, 2013

(65) Prior Publication Data

US 2013/0294308 A1 Nov. 7, 2013

Related U.S. Application Data

(60) Provisional application No. 61/642,370, filed on May 3, 2012.

(51) Int. Cl.
| | | |
|---|---|---|
| *H04W 24/10* | (2009.01) | |
| *H04W 84/18* | (2009.01) | |
| *H04L 12/823* | (2013.01) | |
| *H04W 52/02* | (2009.01) | |
| *H04W 28/06* | (2009.01) | |
| *H04W 4/00* | (2009.01) | |

(52) U.S. Cl.
CPC ............ *H04W 24/10* (2013.01); *H04L 47/32* (2013.01); *H04W 4/005* (2013.01); *H04W 28/06* (2013.01); *H04W 52/0261* (2013.01); *H04W 84/18* (2013.01); *Y02B 60/50* (2013.01)

(58) Field of Classification Search
CPC ........ H04L 47/32; H04L 47/326; H04L 47/31; H04W 4/005; H04W 84/18
See application file for complete search history.

(56) References Cited

U.S. PATENT DOCUMENTS

| | | | |
|---|---|---|---|
| 6,333,917 B1* | 12/2001 | Lyon ................... | H04L 12/5602 370/236 |
| 7,177,304 B1* | 2/2007 | Mo et al. ...................... | 370/356 |
| 9,094,916 B1* | 7/2015 | Hui .................... | H04W 52/0261 |
| 2007/0165566 A1* | 7/2007 | Khan et al. ................... | 370/329 |
| 2011/0319020 A1* | 12/2011 | Desai et al. ................. | 455/41.2 |

(Continued)

OTHER PUBLICATIONS

Anonyomous, "EE 424 #1: Sampling and Reconstruction", Jan. 13, 2011, pp. 1-30, Iowa State, United States (downloaded from http://www.ece.iastate.edu/~namrata/EE424/11.pdf)

(Continued)

*Primary Examiner* — Hoon J Chung
(74) *Attorney, Agent, or Firm* — Sherman IP LLP; Kenneth L. Sherman; Steven Laut

(57) ABSTRACT

An embodiment of wireless communication in a wireless sensor network (WSN) comprises selecting amount of information transmission from a sensor node utilizing a transmission parameter, wherein the transmission parameter indicates the amount of sensed information to discard from a transmission. Sensed information from a sensor node is transmitted based on the transmission parameter. Discarded sensor information is reconstructed at a receiver based on received sensor information and utilizing information correlation.

22 Claims, 8 Drawing Sheets

(56) References Cited

U.S. PATENT DOCUMENTS

2013/0127637 A1* 5/2013 Seroussi et al. ......... 340/870.39

OTHER PUBLICATIONS

Wang, Y., "EE3414 Multimedia Communication Systems—I, Sampling and Interpolation", 2006, pp. 1-34, Polytechnic University, United States.
Rehfeld, K. et al., "Comparison of correlation analysis techniques for irregularly sampled time series", Jun. 23, 2011, pp. 1-2, Nonlinear Processes in Geophysics, United States.
Ayaz, H., "Short notes on B-Spline Interpolation, Approximation and Reconstruction filters", 2003, pp. 1-5, Bogazici University, Turkey.

* cited by examiner

10

ENERGY EFFICIENT STAGGERED SHORT TRANSMISSIONS (SST) PROTOCOL FOR WIRELESS SENSOR NETWORKS (WSN)

CROSS-REFERENCE TO RELATED APPLICATIONS

This application claims the priority benefit of U.S. Provisional Patent Application Ser. No. 61/642,370, filed on May 3, 2012, incorporated herein by reference.

TECHNICAL FIELD

One or more embodiments relate generally to wireless communication and, in particular, to energy efficient wireless communication.

BACKGROUND

Sensor networks are utilized for transmitting information within sensor communication systems. A sensor network that operates on wireless radio frequency (RF) channels is known as a wireless sensor network (WSN). A WSN typically includes multiple spatially-distributed sensor nodes and one or more sinks (or base stations). The sensor nodes sense physical information and transmit the sensed information as measurement samples to the sink. The entire set of measurements is transmitted. The sink can query information and provides coordination by controlling functions of the sensor nodes.

SUMMARY

One embodiment provides wireless communication in a wireless sensor network (WSN). An embodiment of wireless communication in a wireless sensor network (WSN) comprises selecting an amount of information transmission from a sensor node utilizing a transmission parameter, wherein the transmission parameter indicates the amount of sensed information to discard from a transmission. Sensed information from a sensor node is transmitted based on the transmission parameter. Discarded sensor information is reconstructed at a receiver based on received sensor information by utilizing information correlation.

According to another embodiment, a wireless sensor for a wireless sensor network (WSN) comprises a monitoring module for sensing information, and a transmission module configured for transmitting sensed information to a base station based on a transmission parameter, wherein the transmission parameter indicates the amount of sensed information to discard from a transmission.

These and other features, aspects and advantages of the embodiments will become understood with reference to the following description, appended claims and accompanying figures.

DETAILED DESCRIPTION

One or more embodiments relate to energy efficient wireless communications in wireless sensor networks.

One embodiment provides energy saving for the sensors in a WSN based on measurement correlation as a trade-off between desired energy savings and fidelity of the reconstructed information at the base station. Typically sensor node measurements over time at a given location are correlated. The extent of correlation depends on the characteristics of the environment. Examples of sensor node data include environmental data such as temperature and humidity in a region. As such, generally, it is unnecessary to transmit each and every sensor node measurement.

One or more embodiments provide wireless communication in a wireless sensor network (WSN). An embodiment of wireless communication in a wireless sensor network (WSN) comprises selecting amount of information transmission from a sensor node utilizing a transmission parameter, wherein the transmission parameter indicates the amount of sensed information to discard from a transmission. Sensed information from a sensor node is transmitted based on the transmission parameter. Discarded sensor information is reconstructed at a receiver based on received sensor information by utilizing information correlation.

According to another embodiment, a wireless sensor for a wireless sensor network (WSN) comprises a monitoring module for sensing information and a transmission module configured for transmitting sensed information to a base station based on a transmission parameter, wherein the transmission parameter indicates the amount of sensed information to discard from a transmission.

One or more embodiments provide a Staggered Short Transmission (SST) protocol for a WSN. The SST protocol utilizes measurement correlations and improves (i.e., reduces) sensor node energy consumption. In addition to energy savings, the SST protocol also accounts for signal-to-noise ratio (SNR) of the received data. An embodiment of the SST protocol provides a trade-off between the energy savings and the SNR of the received data.

Figure 1:
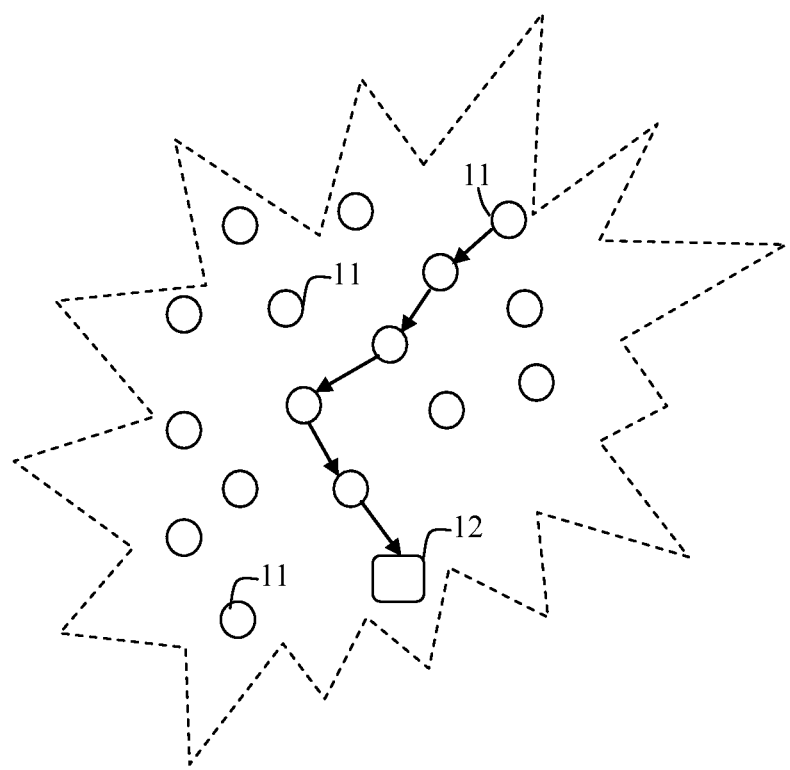
FIG. 1 shows a block diagram of a wireless sensor network (WSN) implementing a staggered short transmission (SST) protocol, according to an embodiment.

Another consideration is that without phase shifts, snapshots of measurement space would not be comparable in terms of accuracy. Embodiments of the SST protocol provide schemes for accommodating measurement space snapshot comparison, allowing comparison of measurement space snapshots in terms of complexity and performance. This provides energy efficient Wireless Sensor Networks (WSN), wherein measurement space snapshots are comparable in accuracy. FIG. 1 shows a block diagram of a wireless sensor network (WSN) 10, according to an embodiment. The WSN 10 comprises autonomous sensor nodes 11 that are spatially distributed. Each sensor node 11 can communicate with one or more sensors nodes 11. The sensors then cooperatively communicate their sensed data through a wireless network to a coordinator node (base station) 12 at a receiving location, via a wireless communication medium such as radio frequency (RF) channels.

Figure 2:
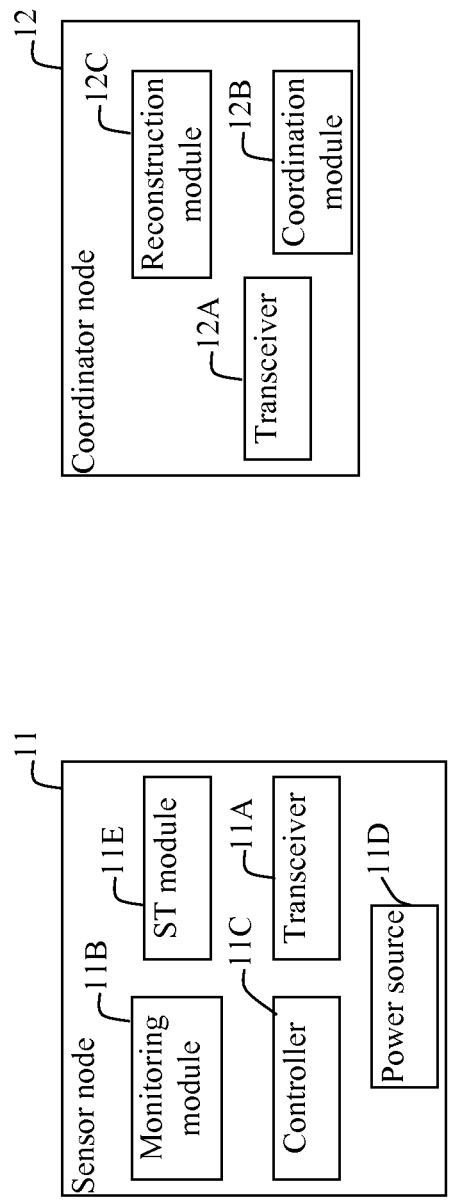
FIG. 2 shows a block diagram of a sensor node and a coordinator node in the WSN of FIG. 1, according to an embodiment.

FIG. 2 shows a block diagram of a sensor node 11, according to an embodiment. The sensor node 11 comprises an electronic device including a wireless communication transceiver 11A and one or more monitoring modules 11B that monitor physical or environmental conditions and generate data samples for the monitored phenomena. The sensor node 11 further includes a controller 11C and an electrical power source 11D, such as a battery. The controller 11C includes processing, memory, and logic modules. The sensor node 11 further includes a shortening transmission module (ST module) 11E, according to an embodiment.

FIG. 2 further shows a block diagram of a coordinator node 12, according to an embodiment. The coordinator node 12 comprises an electronic device including a wireless communication transceiver 12A, a coordination module 12B, and a reconstruction module 12C, according to an embodiment.

A framework for an implementation of a SST protocol, according to an embodiment, is provided wherein the measurements space matrix of a WSN is mathematically modeled as follows:

$$\begin{bmatrix} s(x_1, y_1, t_1) & s(x_1, y_1, t_2) & \ldots & s(x_1, y_1, t_M) \\ s(x_2, y_2, t_1) & s(x_2, y_2, t_2) & \ldots & s(x_2, y_2, t_M) \\ \vdots & \vdots & \ldots & \vdots \\ \vdots & \vdots & \ldots & \vdots \\ \vdots & \vdots & \ldots & \vdots \\ s(x_N, y_N, t_1) & s(x_N, y_N, t_2) & \ldots & s(x_N, y_N, t_M) \end{bmatrix}$$

In the above matrix, $s(x_i,y_i,t_j)$ denotes a single scalar measurement at a physical location $(x_i,y_i)$ at time $t_j$. Each matrix column represents a measurement snapshot of the entire network domain at a point in time and each matrix row represents a measurement vector corresponding to a given sensor node over time.

Energy Savings

In the following description, measurements corresponding to a given sensor node are utilized, and as such, the reference to location is dropped for simplicity. M discrete sensor node measurements are represented by a set $S(n)=\{S_1, S_2, \ldots, S_M\}$, wherein the process is assumed to be wide sense stationary. In one embodiment, the ST module 11E of a sensor node 11 selectively discards (drops) sensed/measured samples from a transmission, as described further herein according to embodiments. As such the duration of sensor node transmissions is shortened, thereby reducing the energy consumption per sensor node, and thereby increasing the sensor node battery life. The reconstruction module 12C of the coordinator node 12 uses correlation among samples to reconstruct estimates of the discarded samples based on the received samples, as described further herein according to embodiments.

Figure 3:
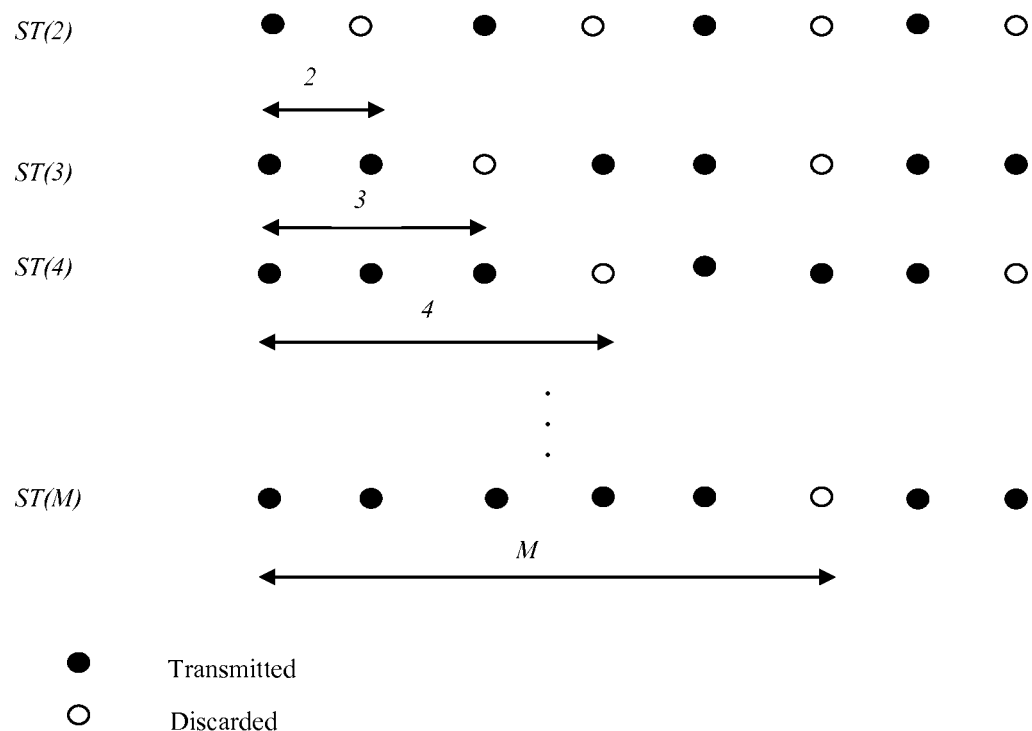
FIG. 3 illustrates example SST sequences for a WSN, according to an embodiment.

FIG. 3 illustrates example SST sequences for a sensor node 11 in a WSN, according to an embodiment. Shortened transmission with a transmission parameter P denoted by ST(P) implies that 1 out of P samples from a given sensor node are discarded before transmission. Consequently, in ST(2), ST(3), . . . , ST(M), every other sample, every third sample, . . . , or every $M^{th}$ sample is discarded, respectively.

In one implementation of the SST protocol, the values $E_2$, $E_3$, . . . , $E_M$ denote the transmission energy associated with shortened transmission ST(2), ST(3), . . . , ST(M).

Consequently, the energy savings associated with ST(2), ST(3), . . . , ST(M) are given by 1/j, where j=2, 3, . . . , M, according to an embodiment.

According to an embodiment, different sensors can utilize different P parameters for dropping samples. The P parameter can be fixed or can be changed in real-time. This allows flexible local resolution at individual sensors as opposed to a single fixed resolution for the entire sensor network.

Reconstruction of Signal-to-Noise Ratio

In an embodiment, according to the SST protocol, upon receiving data in shortened transmissions from the sensors, the coordinator node estimates the missing samples based on the received samples (utilizing information correlation as described above). In one implementation, the coordinator node includes an estimation module that performs filter-based interpolation and cubic splines. In one example, utilizing ST(2), wherein every other sample is discarded by the sensor node before transmission, the expression below represents multiple original sensor node measurement samples:

$$S(n)=\{S_1,S_2,S_3,S_4,S_5,S_6,\ldots\},$$

the expression below represents estimated samples at the coordinator:

$$\tilde{S}(n)=\{S_1,\tilde{S}_2,S_3,\tilde{S}_4,S_5,\tilde{S}_6,\ldots\},$$

and the expression below represents estimation noise:

$$N(n)=\{0,S_2-\tilde{S}_20,S_4-\tilde{S}_40,S_6-\tilde{S}_6,\ldots\}.$$

In one embodiment, the coordinator node provides estimates for the missing samples. Reconstruction of missing samples can comprise model-based techniques which typically result in superior reconstruction quality ("good estimates"), but require more knowledge of the underlying source and characterization of the response. On the other hand, Non-parametric schemes do not require any modeling effort but the results are not as reliable. If knowledge resource is available and since more processing power is available at the coordinator relative to the sensors, model based techniques are preferred.

Figure 4A:
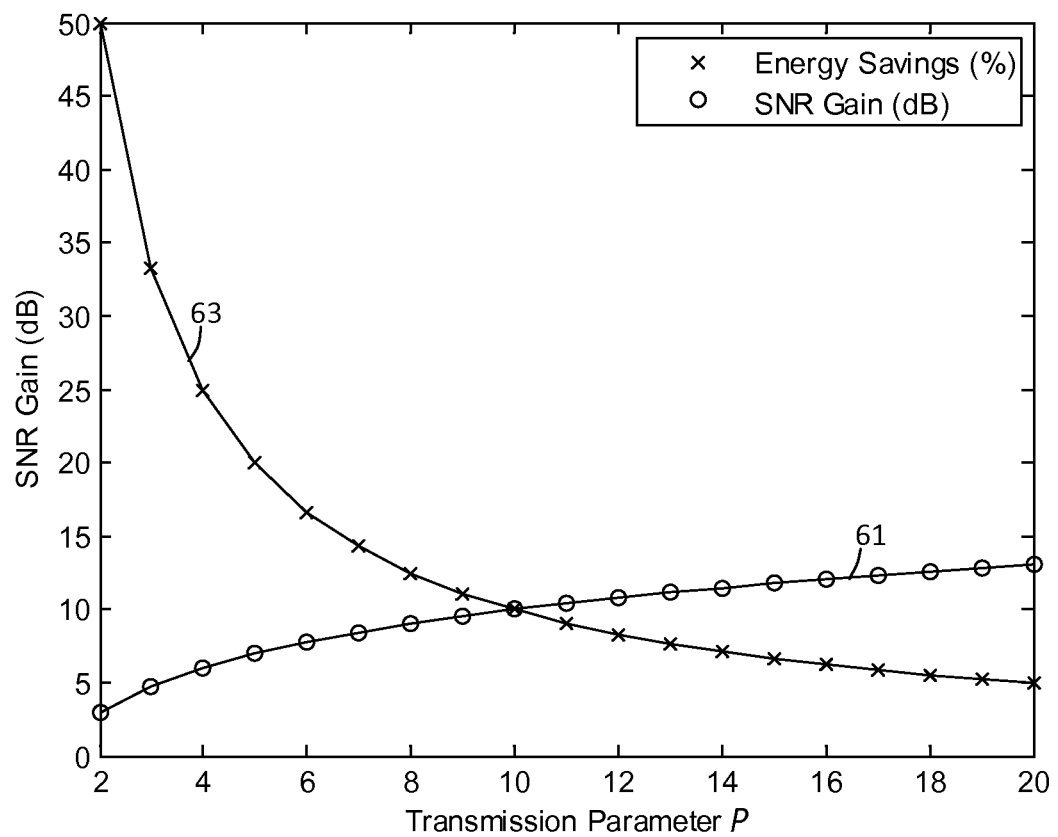
FIG. 4A illustrates example plots of the expressions for signal to noise ratio (SNR) gain and energy savings vs. transmission shortening parameters, according to an embodiment.

FIG. 4A illustrates example plots 60 of the expressions for SNR gain and energy savings versus transmission parameter P. As illustrated by plot 61, SNR increases in a logarithmic manner from about 2 to about 13 dB as parameter P increases from about 2 to about 20. As plot 63 indicates, energy savings decrease rather quickly between about P=2 to P=10 from about 50% to about 10%. Beyond that, reduction rate slows down significantly. From about P=10 to P=20, the energy savings drops from about 10% to about 5%. While SNR increases as P increases, energy savings decreases as P increases. As such, the selection of parameter P presents a trade-off between energy savings and SNR gain (i.e., a trade-off between desired energy savings and fidelity of the reconstructed information at the coordinator node).

Figure 4B:
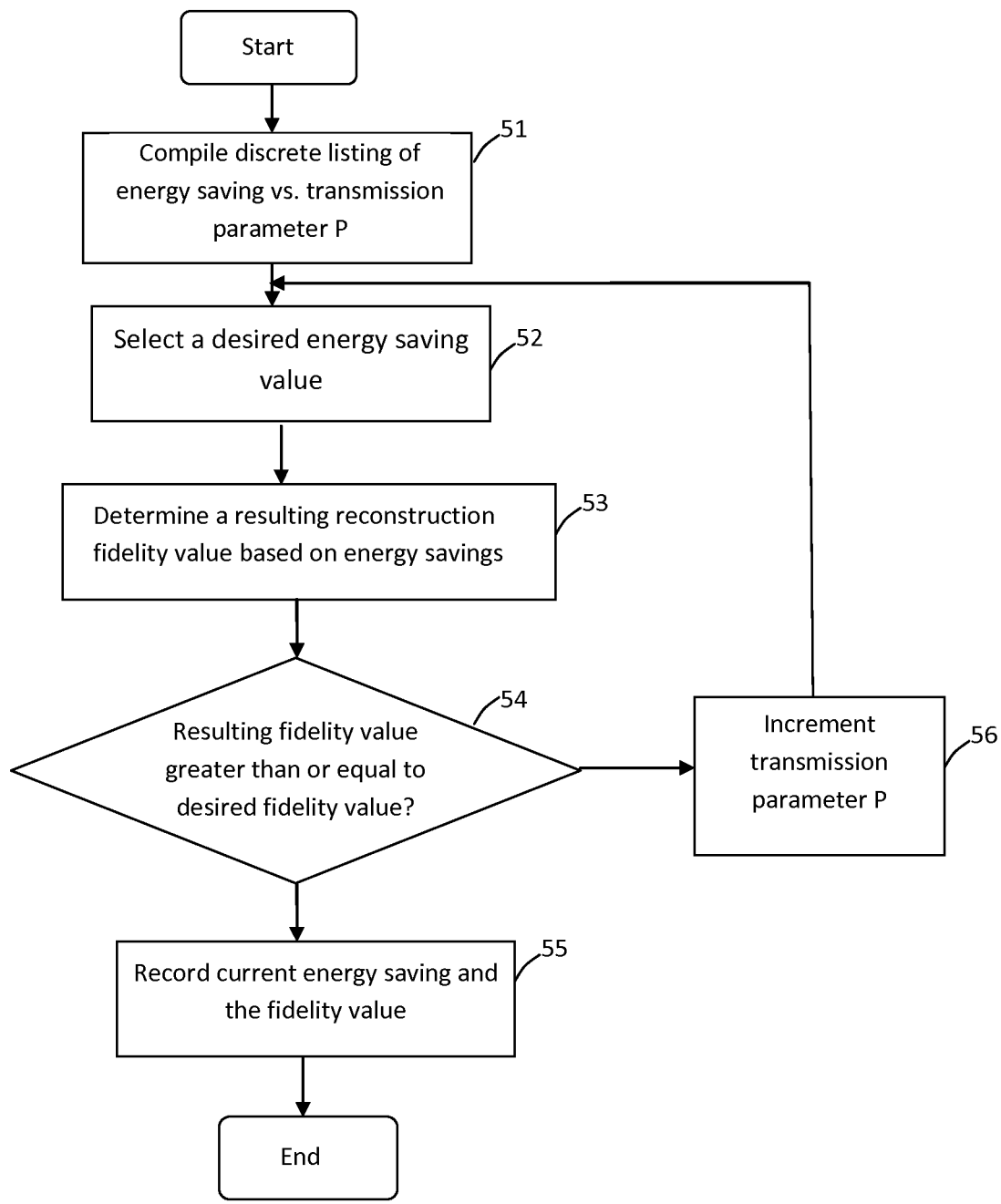
FIG. 4B illustrates a process for performing trade-off between SNR gain and energy savings versus transmission shortening parameters, according to an embodiment.

FIG. 4B illustrates a process 50 for performing said trade-off, according to an embodiment. Process block 51 comprises apriori compilation of a discrete listing of energy savings versus transmission parameter P. Process block 52 comprises selecting a desired energy saving value based on requirements at hand (e.g., characteristics of the sensors such as power source, coordinator, monitored environment, communication bandwidth, SNR at the coordinator, etc.).

Since energy savings and reconstruction fidelity are related, this leads to a reconstruction fidelity value, wherein process block 53 comprises determining a resulting reconstruction fidelity value based on energy savings. Process block 54 comprises determining if the resulting fidelity value is equal to or greater than a desired fidelity value. If yes, then in process block 55 both the current energy saving and the fidelity value are recorded and used. Otherwise, in process block 56 the current energy saving value is incremented corresponding to a unity increment of P and the process steps are repeated until convergence is reached in process block 55.

Staggered Transmissions

In one embodiment, the ST module 11E in all sensors in the WSN deploys ST(J) with the same phase shift, wherein the phase shift is based on one or more transmission parameters that define selection samples to discard. This is equivalent to discarding a matrix column all together in said measurement space matrix. That column is estimated by the coordinator node reconstruction module 12C and is substituted back into an observation matrix reconstructed at the coordinator node. However, the entire snapshot (equivalent to the estimated matrix column) could be noisy. The estimated samples are spread over the observation matrix columns as opposed to co-locating them all in one column, utilizing the scheme options below.

In a first scheme option, a random phase shift is assigned to each sensor node to begin discarding randomly selected measurement samples, before measurement sample transmission to the coordinator node. This option does not require coordination, but is limited in accuracy when several reconstructed missing samples could occur in one snapshot.

Figure 5:
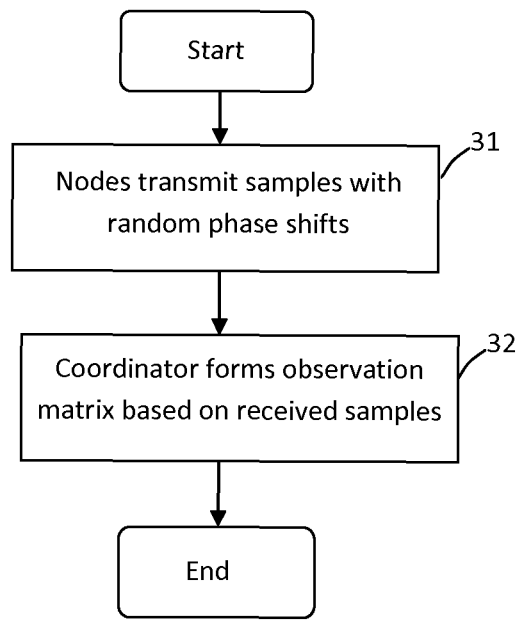
FIG. 5 shows a flowchart of a process for shortened transmissions using random phase shifts at sensor nodes, according to an embodiment.

As such, sensor nodes transmit sample data packets based on random phase shifts (i.e., discarding randomly selected measurement samples). In reconstructing missing samples (i.e., samples discarded at sensor nodes), the coordinator node forms the estimates for the missing samples into an observation matrix. FIG. 5 shows a flowchart of a process 30 for shortened transmissions using random phase shifts at sensor nodes. Process block 31 comprises sensor nodes transmitting samples with random phase shifts. Process block 32 comprises coordinator node forming (i.e., reconstructing) an observation matrix based on the received samples. In one implementation, forming the observation matrix comprises estimation based on received samples and using correlation between samples.

In a second scheme option, the coordinator node assigns (i.e., dictates) the required phase shift to each sensor node. The estimated samples are staggered in time such that they end up on different matrix columns. Though the second option involves coordination by signaling and utilizes transmission bandwidth, the second option mitigates the limits of the first option. Further, the second option enables the coordinator node to monitor the incoming (i.e., received) sensor node measurements and make the best use of the resources in terms of determining shortened transmission schemes. For example, the coordinator node can lower the energy consumption of certain sensors in the network where accuracy is not required, by assigning different phase shifts to different sensor nodes. The coordinator node can also spread the estimates over the space in a desired fashion if the topology is known to the coordinator node.

The procedure for option two is more involved and comprises three phases. Initially, the coordinator node instructs each sensor node to transmit with a certain parameter and a certain phase shift. Sensor nodes form packets and transmit according to the coordinator node's instructions. The coordinator node receives the transmissions and forms the reconstructed samples in an observation matrix.

Figure 6:
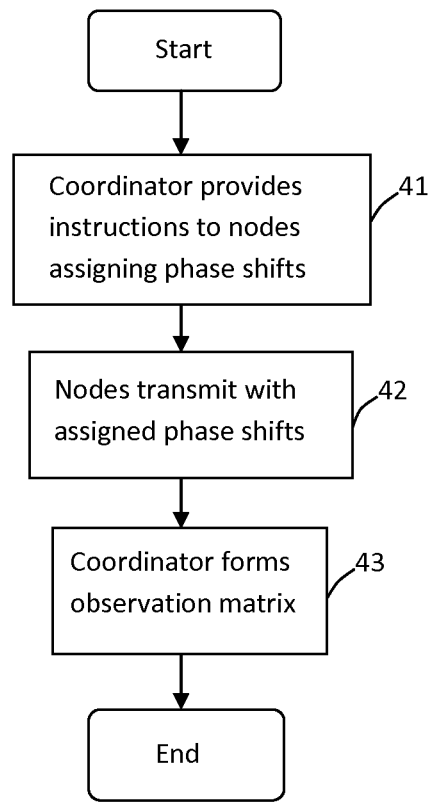
FIG. 6 shows a flowchart of a coordinated staggered short transmission process for shortened transmissions using assigned phase shifts, according to an embodiment.

FIG. 6 shows a flowchart of a coordinated staggered short transmission process 40 for shortened transmissions using assigned phase shifts. Process block 41 comprises a coordinator node instructing nodes to transmit with phase shifts assigned by the coordinator node for each sensor node. As such, each node discards samples based on the phase shift assigned to that node. Process block 42 comprises the nodes transmitting samples based on assigned phase shifts. Process block 43 comprises the coordinator node forming a reconstructed observation matrix based on received samples. In one implementation, forming the observation matrix comprises estimation based on received samples and using correlation between samples.

The above schemes provide parametric techniques to lower transmission load of the sensors, according to embodiments. The parameters comprise phase shifts for discarding certain samples at the sensors before transmission to the coordinator node. The phase shifts can be selected a priori (e.g., random phase shifts) or selectively assigned by the coordinator node in real time.

The parameter values based on which selected samples are discarded at sensors, are determined using a trade-off analysis as described herein above. The parameter values can be assigned by the coordinator node or by sensor nodes themselves. The examples described hereinabove include one option wherein the coordinator node determines the parameter values and another option without any coordination. As such, the coordinator node can choose to provide instructions to the sensor nodes as to how much information they transmit (i.e., how many samples to discard before sample transmission). And, the sensor nodes can themselves be selective as to how much information they transmit. The coordinator node reconstructs the measurements utilizing measurement correlation and generates an observation matrix. The transmission parameters for selective discarding of sample before transmission can be either fixed or changed in real time. A trade-off analysis between the energy savings and reconstruction SNR is utilized for parameter selection. Example implementation of the present embodiments lowers the energy consumption of sensors by up to about 50% (or equivalently battery life can be extended by a factor of two).

As is known to those skilled in the art, the aforementioned example architectures described above, according to the present embodiment, can be implemented in many ways, such as program instructions for execution by a processor, as software modules, microcode, as computer program product on computer readable media, as logic circuits, as application specific integrated circuits, as firmware, as consumer electronic devices, etc., in wireless devices, in wireless transmitters, receivers, transceivers in wireless networks, etc. Further, embodiments can take the form of an entirely hardware embodiment, an entirely software embodiment or an embodiment containing both hardware and software elements.

Figure 7:
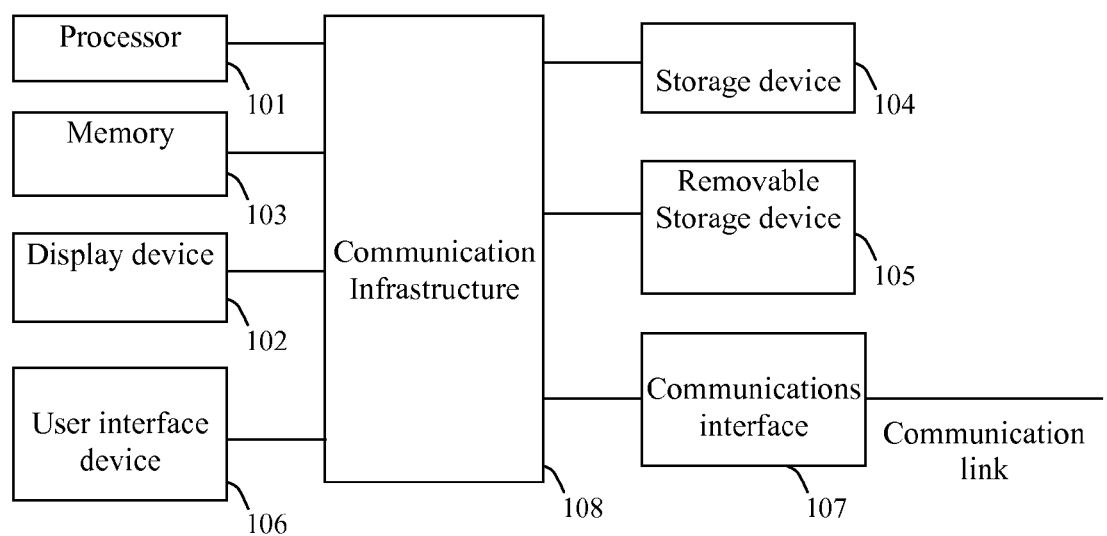
FIG. 7 is a high-level block diagram showing an information processing system comprising a computer system useful for implementing embodiments.

FIG. 7 is a high level block diagram showing an information processing system comprising a computer system 100 useful for implementing the disclosed embodiments. The computer system 100 includes one or more processors 101, and can further include an electronic display device 102 (for displaying graphics, text, and other data), a main memory 103 (e.g., random access memory (RAM)), storage device 104 (e.g., hard disk drive), removable storage device 105 (e.g., removable storage drive, removable memory module, a magnetic tape drive, optical disk drive, computer readable medium having stored therein computer software and/or data), user interface device 106 (e.g., keyboard, touch screen, keypad, pointing device), and a communication interface 107 (e.g., modem, a network interface (such as an Ethernet card), a communications port, or a PCMCIA slot and card). The communication interface 107 allows software and data to be transferred between the computer system and external devices. The system 100 further includes a communications infrastructure 108 (e.g., a communications bus, cross-over bar, or network) to which the aforementioned devices/modules 101 through 107 are connected.

Information transferred via communications interface 107 may be in the form of signals such as electronic, electromagnetic, optical, or other signals capable of being received by communications interface 107, via a communication link that carries signals and may be implemented using wire or cable, fiber optics, a phone line, a cellular phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products. Each block of such illustrations/diagrams, or combinations thereof, can be implemented by computer program instructions. The computer program instructions when provided to a processor produce a machine, such that the instructions, which execute via the processor create means for implementing the functions/operations specified in the flowchart and/or block diagram. Each block in the flowchart/block diagrams may represent a hardware and/or software module or logic. In alternative implementations, the functions noted in the blocks may occur out of the order noted in the figures, concurrently, etc.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Furthermore, the computer readable medium may comprise computer readable information in a transitory state medium such as a network link and/or a network interface, including a wired network or a wireless network, that allow a computer to read such computer readable information. Computer programs (i.e., computer control logic) are stored in main memory and/or secondary memory. Computer programs may also be received via a communications interface. Such computer programs, when executed, enable the computer system to perform the features as discussed herein. In particular, the computer programs, when executed, enable the processor multi-core processor to perform the features of the computer system. Such computer programs represent controllers of the computer system.

Though the embodiments have been described with reference to certain versions thereof; however, other versions are possible. Therefore, the spirit and scope of the appended claims should not be limited to the description of the preferred versions contained herein.

What is claimed is:

1. A method of wireless communication in a wireless sensor network (WSN) of sensor nodes, comprising:
    selecting an amount of measurement sample transmission from a sensor node in the WSN utilizing a transmission parameter, wherein battery energy savings of the sensor node decrease as the transmission parameter increases, and the transmission parameter comprises a phase shift for discarding certain measurement samples in a measurement space matrix from a transmission of measurement samples;
    discarding measurement samples from sensed measurement samples based on the transmission parameter; and
    transmitting the measurement samples from the sensor node without discarded measurement samples based on the transmission parameter.

2. The method of claim 1, further comprising:
    determining the transmission parameter based on a trade-off between energy savings and fidelity of reconstructed estimates for the discarded amount of measurement samples,
    wherein the transmission parameter is denoted as P, and 1 out of P measurement samples from a particular sensor node are discarded before the measurement samples are transmitted, where P is a positive integer.

3. The method of claim 2, further comprising:
    determining the transmission parameter a priori to the selecting of the amount of measurement sample transmission.

4. The method of claim 2, further comprising:
    determining the transmission parameter in real-time.

5. The method of claim 1, further comprising:
    each sensor node determining the amount of measurement sample transmission based on a particular transmission parameter and monitoring at least one of a physical condition and an environment condition.

6. The method of claim 5, further comprising:
    utilizing a random phase shift for a sensor node to begin discarding selected transmission of measurement samples in the measurement space matrix.

7. The method of claim 1, further comprising:
    each sensor node selecting the amount of measurement sample transmission; and
    causing estimates for the discarded amount of measurement samples to be reconstructed at a receiver based on the transmitted measurement samples, utilizing measurement sample correlation.

8. The method of claim 1, further comprising:
    each sensor node receiving assignment of the amount of measurement sample transmission.

9. The method of claim 8, further comprising:
    each sensor node selecting certain measurement samples to discard from the measurement space matrix based on assigned phase shifts.

10. A non-transitory processor-readable medium that includes a program that when executed by a processor performs a method comprising:
selecting an amount of measurement sample transmission from a sensor node in a wireless sensor network (WSN) utilizing a transmission parameter, wherein battery energy savings of the sensor node decrease as the transmission parameter increases, and the transmission parameter comprises a phase shift for discarding certain measurement samples in a measurement space matrix from a transmission of measurement samples;
discarding measurement samples from the transmission of measurement samples; and
transmitting the measurement samples from the sensor node without the discarded amount of measurement samples based on the transmission parameter.

11. The non-transitory processor-readable medium of claim 10, wherein the method further comprising:
determining the transmission parameter based on a trade-off between energy savings and fidelity of reconstructed estimates for the discarded amount of measurement samples,
wherein the transmission parameter is denoted as P, and 1 out of P measurement samples from a particular sensor node are discarded before the measurement samples are transmitted, where P is a positive integer.

12. The non-transitory processor-readable medium of claim 11, wherein the method further comprising:
determining the transmission parameter a priori to the selecting of the amount of measurement samples.

13. The non-transitory processor-readable medium of claim 11, wherein the method further comprising:
determining the transmission parameter in real-time; and
reconstructing estimates for the discarded amount of measurement samples at a receiver based on received measurement samples, utilizing measurement sample correlation.

14. The non-transitory processor-readable medium of claim 10, wherein the method further comprising:
each sensor node determining the amount of measurement sample transmission based on a particular transmission parameter and monitoring at least one of a physical condition and an environment condition.

15. The non-transitory processor-readable medium of claim 14, wherein the method further comprising:
utilizing a random phase shift for a sensor node to begin discarding selected measurement samples in the measurement space matrix.

16. The non-transitory processor-readable medium of claim 10, wherein the method further comprising:
each sensor node selecting the amount of measurement sample transmission; and
reconstructing estimates for the discarded amount of measurement samples at a receiver based on received measurement samples, utilizing measurement sample correlation.

17. The non-transitory processor-readable medium of claim 10, wherein the method further comprising:
each sensor node receiving assignment of the amount of measurement sample transmission.

18. The non-transitory processor-readable medium of claim 17, wherein the method further comprising:
each sensor node selecting certain measurement samples to discard from the measurement space matrix based on assigned phase shifts.

19. A wireless sensor for a wireless sensor network (WSN), comprising:
a monitoring processor configured to monitor one or more sensor nodes and to generate measurement samples; and
a transmitter configured to transmit measurement samples based on a transmission parameter, wherein battery energy savings of the one or more sensor nodes decrease as the transmission parameter increases, and the transmission parameter comprises a phase shift for discarding certain measurement samples in a measurement space matrix from a transmission of the measurement samples.

20. The wireless sensor of claim 19, wherein:
the transmitter is configured to discard measurement samples from the transmission of measurement samples based on the transmission parameter,
estimates for reconstruction of the discarded amount of measurement samples are based on the transmitted measurement samples, utilizing measurement sample correlation; and
the transmission parameter is based on a trade-off between energy savings and fidelity of the reconstructed estimates for the discarded amount of measurement samples.

21. The wireless sensor of claim 19, wherein:
the transmitter utilizes a random phase shift for the wireless sensor node to begin discarding selected measurement samples in the measurement matrix.

22. The wireless sensor of claim 19, wherein:
the wireless sensor node selects certain measurement samples to discard from the measurement space matrix based on an assigned phase shift.

* * * * *